(12) United States Patent
Reeve et al.

(10) Patent No.: US 10,831,774 B2
(45) Date of Patent: Nov. 10, 2020

(54) ACCUMULATING RESULTS FROM BATCH PROCESSING AND RESUMING EXECUTION OF A DATA INTEGRATION FLOW WITH THE ACCUMULATED RESULTS PASSED IN

(71) Applicant: International Business Machines Corporation, Armonk, NY (US)

(72) Inventors: John A. Reeve, Winchester (GB); Chengxuan Xing, Romsey (GB); Doina Liliana Klinger, Winchester (GB); Vlad Balanescu, Stanmore (GB)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/122,137

(22) Filed: Sep. 5, 2018

(65) Prior Publication Data
US 2020/0073991 A1    Mar. 5, 2020

(51) Int. Cl.
G06F 16/25    (2019.01)
G06F 16/23    (2019.01)

(52) U.S. Cl.
CPC ........ G06F 16/254 (2019.01); G06F 16/2386 (2019.01)

(58) Field of Classification Search
CPC ... G06F 16/254; G06F 16/2386; G06F 9/3885
See application file for complete search history.

(56) References Cited

U.S. PATENT DOCUMENTS

| | | | |
|---|---|---|---|
| 8,307,109 B2 | 11/2012 | Mamou et al. | |
| 2003/0058277 A1* | 3/2003 | Bowman-Amuah | G06F 16/289 715/765 |
| 2007/0130152 A1* | 6/2007 | Kosov | G06Q 10/10 |
| 2011/0252073 A1* | 10/2011 | Pauly | G06F 16/13 707/812 |
| 2013/0117229 A1* | 5/2013 | Jain | G06F 13/22 707/634 |
| 2014/0180754 A1 | 6/2014 | Arbogast | |

(Continued)

OTHER PUBLICATIONS

Liu et al., "Survey of Real-time Processing Systems for Big Data," IDEAS '14 Proceedings of the 18th International Database Engineering & Applications Symposium, Porto, Portugal, Jul. 7-9, 2014, pp. 356-361.

*Primary Examiner* — James Trujillo
*Assistant Examiner* — Michal Bogacki
(74) *Attorney, Agent, or Firm* — Yee & Associates, P.C.

(57) ABSTRACT

Passing a result of batch processing into a data integration flow is provided. Each data record of a plurality of data records corresponding to a specified data record collection is processed within a different thread of a different execution branch in parallel. At an end of each processing of each different execution branch, a new value is computed for each processed data record based on a previously stored value and an execution branch context for each processed data record. It is determined whether all data records in the plurality of data records have been processed. In response to determining that all of the data records in the plurality of data records have been processed, a data accumulation object corresponding to the batch processing is updated within a data assembly context based on a computed new value for each processed data record to form an updated data assembly context.

17 Claims, 6 Drawing Sheets

(56) References Cited

U.S. PATENT DOCUMENTS

| | | | |
|---|---|---|---|
| 2014/0331322 A1* | 11/2014 | Jaroch | G06F 21/56 |
| | | | 726/23 |
| 2015/0149870 A1* | 5/2015 | Kozat | G06F 11/1096 |
| | | | 714/772 |
| 2016/0285711 A1 | 9/2016 | Akidau et al. | |
| 2017/0010826 A1* | 1/2017 | Basham | G06F 3/0631 |
| 2017/0140007 A1* | 5/2017 | Agarwal | G06Q 10/0637 |
| 2019/0007206 A1* | 1/2019 | Surla | G06F 3/0661 |
| 2019/0095494 A1* | 3/2019 | Bhattacharjee | G06F 7/5324 |

* cited by examiner

ACCUMULATING RESULTS FROM BATCH PROCESSING AND RESUMING EXECUTION OF A DATA INTEGRATION FLOW WITH THE ACCUMULATED RESULTS PASSED IN

BACKGROUND

1. Field

The disclosure relates generally to batch processing and more specifically to accumulating results from batch processing executed in parallel and resuming execution of a main data integration flow with the accumulated results passed in.

2. Description of the Related Art

Jobs that run without end user interaction, or can be scheduled to run as resources permit, are called batch jobs. Batch processing is for those frequently used programs that can be executed with minimal human interaction. A program that reads a large file and generates a report, for example, is considered to be a batch job. Batch processing allows the ability to share computer resources among users and programs, shift job processing time to other resources that are less busy, avoid idling computer resources, and amortize computer cost.

To enable the processing of a batch job, a user utilizes job control language (JCL) to tell the operating system which programs to execute and which files are needed by the executing programs. JCL is a name for scripting languages used on mainframe operating systems to instruct the system on how to run a batch job. For example, JCL allows the user to describe certain attributes of a batch job to the operating system, such as, for example, who submitted the batch job, what programs to run, where input and output are located, and when a job is to run. After the user submits the job to the operating system, there is normally no further human interaction with the batch job until it is complete.

While batch processing remains in use, the outputs of separate stages and input for the subsequent stage) are typically stored as files. Batch processing is commonly used for efficient bulk database updates and automated transaction processing, as contrasted to interactive online transaction processing applications. The extract, transform, load step in populating data warehouses is inherently a batch process in most implementations. Batch processing also is often used to perform various operations with digital images such as resize, convert, watermark, or otherwise edit image files. In addition, batch processing may be used for converting computer files from one format to another. For example, a batch job may convert proprietary and legacy files to common standard formats for end-user queries and display.

SUMMARY

According to one illustrative embodiment, a computer-implemented method for passing a result of batch processing into a data integration flow is provided. A computer, using a batch controller of a bulk-retrieve application step in the data integration flow, processes each data record of a plurality of data records corresponding to a specified data record collection within a different thread of a different execution branch in parallel. The computer, using the batch controller of the bulk-retrieve application step at an end of each processing of each different execution branch, computes a new value for each processed data record based on a previously stored value and an execution branch context for each processed data record. The computer determines whether all data records in the plurality of data records have been processed. In response to the computer determining that all of the data records in the plurality of data records have been processed, the computer, using the batch controller of the bulk-retrieve application step, updates a data accumulation object corresponding to the batch processing within a data assembly context based on a computed new value for each processed data record to form an updated data assembly context. The computer publishes the updated data assembly context containing the data accumulation object corresponding to the batch processing that includes the computed new value for each processed data record to memory. The computer resumes the data integration flow in a next application step in the data integration flow using the updated data assembly context in memory. According to other illustrative embodiments, a computer system and computer program product for passing a result of batch processing into a data integration flow are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
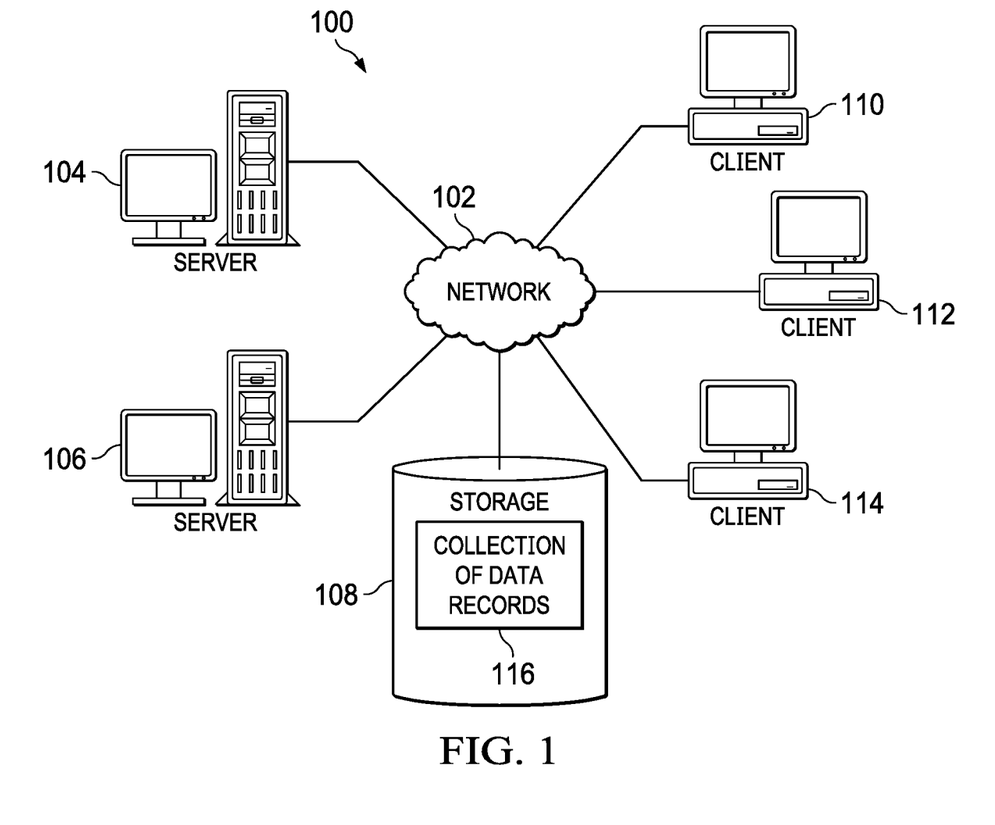
FIG. 1 is a pictorial representation of a network of data processing systems in which illustrative embodiments may be implemented.
Figure 2:
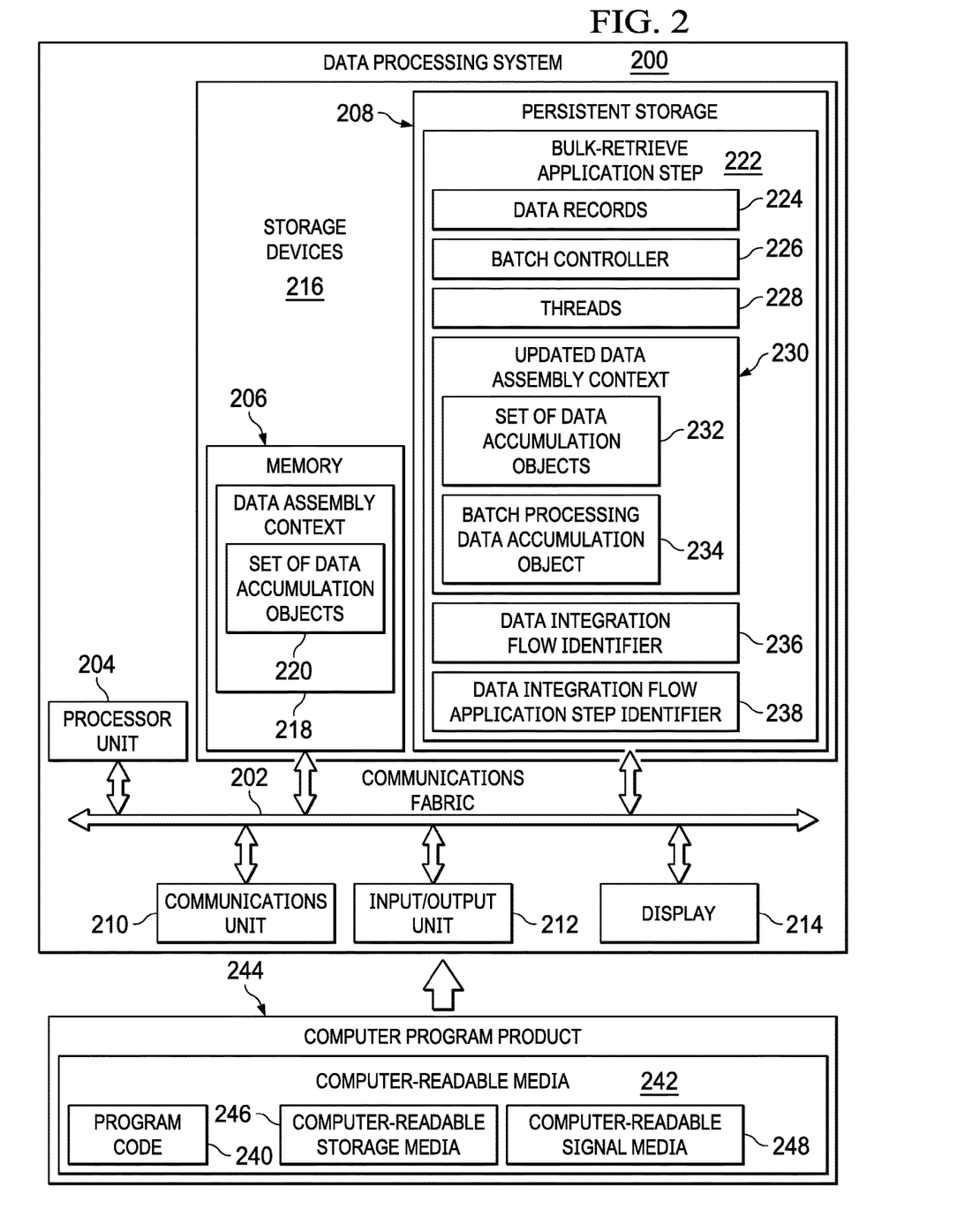
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106, along with storage 108 connect to network 102. Server 104 and server 106 may be, for example, server computers with high-speed connections to network 102. In this example, server 104 executes a user-defined data integration flow for integrating data records of a user-specified collection of data records. Server 106 performs batch processing of the data record collection in parallel and passes the accumulated result of the batch processing to server 104 to complete the data integration flow using the accumulated results. It should be noted that server 104 and server 106 may each represent a cluster of computers in a data center, for example. Alternatively, server 104 and server 106 may each represent computing nodes in a cloud environment providing data integration services.

Client 110, client 112, and client 114 also connect to network 102. Clients 110, 112, and 114 are registered clients of server 104. Users of clients 110, 112, and 114 may utilize clients 110, 112, and 114 to access and utilize the data integration services provided by server 104. In this example, clients 110, 112, and 114 are shown as desktop or personal computers with wire communication links to network 102. However, it should be noted clients 110, 112, and 114 may represent other types of data processing systems, such as, for example, network computers, laptop computers, handheld computers, smart phones, and the like, with wire or wireless communication links to network 102.

Storage 108 represents a set of one or more network storage devices. Storage 108 may store data in a structured or unstructured format. In this example, storage 108 stores collection of data records 116. Collection of data records 116 may represent any collection of data records, such as, for example, a collection of business records, a collection of financial records, a collection of insurance records, a collection of medical records, a collection of bank records, a collection of government records, and the like. Further, collection of data records 116 may represent a plurality of different collections of data records. Furthermore, collection of data records 116 may be distributed across a plurality of different storage devices located locally and/or remotely.

Moreover, it should be noted that network data processing system 100 may include any number of server devices, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium.

Memory 206 may be, for example, a random-access memory, or any other suitable volatile or non-volatile storage device. In this example, memory 206 stores data assembly context 218. Data assembly context 218 represents the original context or parameters of assembling a collection of data records in a particular user-defined data integration flow just prior to suspending the flow. In this example, data assembly context 218 contains set of data accumulation objects 220. Set of data accumulation objects 220 may represent a set of JavaScript Object Notation (JSON) file format data accumulation objects, for example. However, it should be noted that set of data accumulation objects 220 may be in any type of file format. Set of data accumulation objects 220 is a set of one or more data objects, where each data object in the set stores a result of a corresponding application step in the data integration flow. As used herein, an application step is a logical action step that runs a set of program code to perform a particular user-defined function or task in the data integration flow. In addition, data assembly context 218 also may contain an identifier for the data integration flow and an identifier for a next application step in the data integration flow.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores bulk-retrieve application step 222. Bulk-retrieve application step 222 controls the batch processing of data records 224 using batch controller 226. Data records 224 represent a plurality of data records that correspond to a user-specified collection of data records. In other words, a user of a client device, such as client 110 in FIG. 1, specified which collection of data records to bulk process in the data integration flow. The user-specified collection of data records may be, for example, collection of data records 116 in FIG. 1.

In addition, bulk-retrieve application step 222 copies data assembly context 218, which contains set of data accumulation objects 220, and saves the copy of data assembly context 218 in bulk-retrieve application step 222. Further, bulk-retrieve application step 222 suspends the data integration flow and deletes data assembly context 218 and set of data accumulation objects 220 from memory 206 after initiating the batch processing of data records 224.

Batch controller 226 utilizes threads 228 to batch process data records 224 in parallel. Threads 228 represent a plurality of threads of execution in data processing system 200. It should be noted that threads 228 may be located in one multithreaded process or may be located in two or more multithreaded processes. In addition, threads 228 may be located on one or more other data processing systems in addition to, or instead of, data processing system 200. Batch controller 226 utilizes each different thread in threads 228 to process a different data record in data records 224, each different thread executing in a different execution branch of bulk-retrieve application step 222.

Batch controller 226 utilizes set of data accumulation objects 232, which is the saved version of set of data accumulation objects 220 from memory 206, as input into threads 228, as well as data records 224 from a set of one or more other data record sources corresponding to the user-specified collection of data records. Moreover, batch controller 226 generates batch processing data accumulation object 234 in updated data assembly context 230. Updated data assembly context 230 represents an updated version of data assembly context 218 after batch controller 226 receives a result of processing of a data record from each thread in threads 228 and saves the result in batch processing data accumulation object 234.

Upon completion of the parallel bulk processing of data records 224 by threads 228, bulk-retrieve application step 222 publishes updated data assembly context 230, data integration flow identifier 236, and data integration flow application step identifier 238 to the next application step in the data application flow. Data integration flow identifier 236 represents an identifier, such as a name or number, that uniquely identifies the current data integration flow. Data integration flow application step identifier 238 represents a unique identifier for the next application step in the current data integration flow.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a microphone, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In programming models currently used by data integration tools, a user defines data integration flows by configuring application steps that represent interactions with external application step connectors or define control logic in the data integration flow. An application step is configured to perform data accumulation (e.g., aggregating data records of a user-specified collection of data records) by using values of the output of application steps that were executed in the data integration flow prior to the current application step in a given execution branch, before using data records in the current application step's container in the given execution branch. The current application step's runtime computes a data assembly context, which contains a set of one or more data accumulation objects corresponding to the output of each previous application step in a given execution branch that is in scope (e.g., steps that are visible or valid within a portion of the program) at a given point in time. The set of data accumulation objects may be, for example, a set of JSON file format data accumulation objects. However, it should be noted that the set of data accumulation objects may be in any type of file format. Each application step's runtime uses the data assembly context to obtain the application step's input data and then attaches the application step's output (i.e., its data accumulation object) to a specific location within the data assembly context based on a predefined schema.

As an example scenario, a marketing application, via a collaboration channel for example, directs a sales application to bulk-retrieve customer leads. For each customer lead retrieved by the sales application, the sales application generates a row in a new sales campaign spreadsheet. The sales application sends the new sales campaign spreadsheet with the aggregated customer lead data to the marketing application via the collaboration channel.

The user-defined data integration flow above represents logic that is executed when a user creates a new sales campaign. The sales application retrieves all customer lead records and then invokes certain processing (e.g., sending a collaboration channel message) for each retrieved customer lead record. Then, the sales application performs various computations on these customer lead records. For example, the sales application adds the total sum value of the customer leads, the maximum value of customer leads, and a list of all customer leads having a value greater than $100,000.00 to the new sales campaign spreadsheet. The sales application passes the total sum value, maximum value, and list of customer leads on to the next application step in the flow where these values will be added to the new sales campaign spreadsheet.

When the size of a collection of data records being processed (e.g., number of customer leads) is small enough to fit in memory of a computer or machine, then this is an easy problem to solve, which is comparable to the "foreach" construct in various programming languages. An issue appears when the collection of data records is large (e.g., the application step runtime cannot process the data collection in memory). As a result, batch processing needs to be initiated for each record in the data collection, the results of the batch processing need to be collected, and the original data integration flow needs to be continued with the data and context as if it were all being processed in memory.

Illustrative embodiments provide an improved data integration tool that makes it easier for users of the data integration tool to define and calculate data accumulation objects when looping over large data record collections. The data integration tool enables rapid and secure connectivity between application steps using pre-packaged application step connectors for a range of cloud (e.g., database applications) and on-premise applications (e.g., packaged applications) and transforms data to build data integration flows that deliver the data where users need it. Illustrative embodiments improve on current batch processing methods by computing data accumulation objects (i.e., aggregation of the data records) corresponding to the data assembly context based on each record in a user-specified data collection and then continuing execution of a main data integration flow as if illustrative embodiments performed the batch processing during execution of the main data integration flow and passing the data accumulation objects to each application step following the bulk-retrieve application step that performed the batch processing. Illustrative embodiments perform this batch processing without keeping the original data assembly context of the main data integration flow in memory while the batch processing is being executed by the bulk-retrieve application step.

The bulk-retrieve application step generates a well-defined output, which is defined by a predefined schema. At the end of the batch processing of a given execution branch by the bulk-retrieve application step, the user can define a new version of the output using, for example, a previous version of the output, an element of the batch currently being processed, or anything in the data assembly context from application steps prior to the batch processing by the bulk-retrieve application step in the main data integration flow. When executing the batch processing on the large user-specified collection of data records, illustrative embodiments pass the original data assembly context to the bulk-retrieve application step from previous application steps in the main data integration flow and initiate a data accumulation object for the batch processing in the original data assembly context to form an updated data assembly context. In addition, illustrative embodiments stop the main data integration flow and delete from memory the original data assembly context corresponding to the main data integration flow. In other words, illustrative embodiments completely remove the original data assembly context with data accumulation objects from the memory.

Illustrative embodiments process each retrieved data record in the batch in parallel using multithreading and update the values of the data accumulation object corresponding to the batch processing within the updated data assembly context in a thread safe manner. It should be noted that the threads of execution are located in the same computer. Alternatively, each thread of execution may be located in a different computer or in a different process of the same computer. When each thread of each different execution branch has completed, the data accumulation object corresponding to the batch processing contains the computed values across the whole collection of data records. In other words, the data accumulation object corresponding to the batch processing contains an aggregation of the information in all the data records involved in the batch processing. Illustrative embodiments then resume the main data integration flow from a point immediately following the bulk-retrieve application step using the updated data assembly context and finish completing the main data integration flow with the aggregation of the information from all of the data records involved in the batch processing passed in. Thus, illustrative embodiments increase batch processing performance in a data integration flow.

Figure 3:
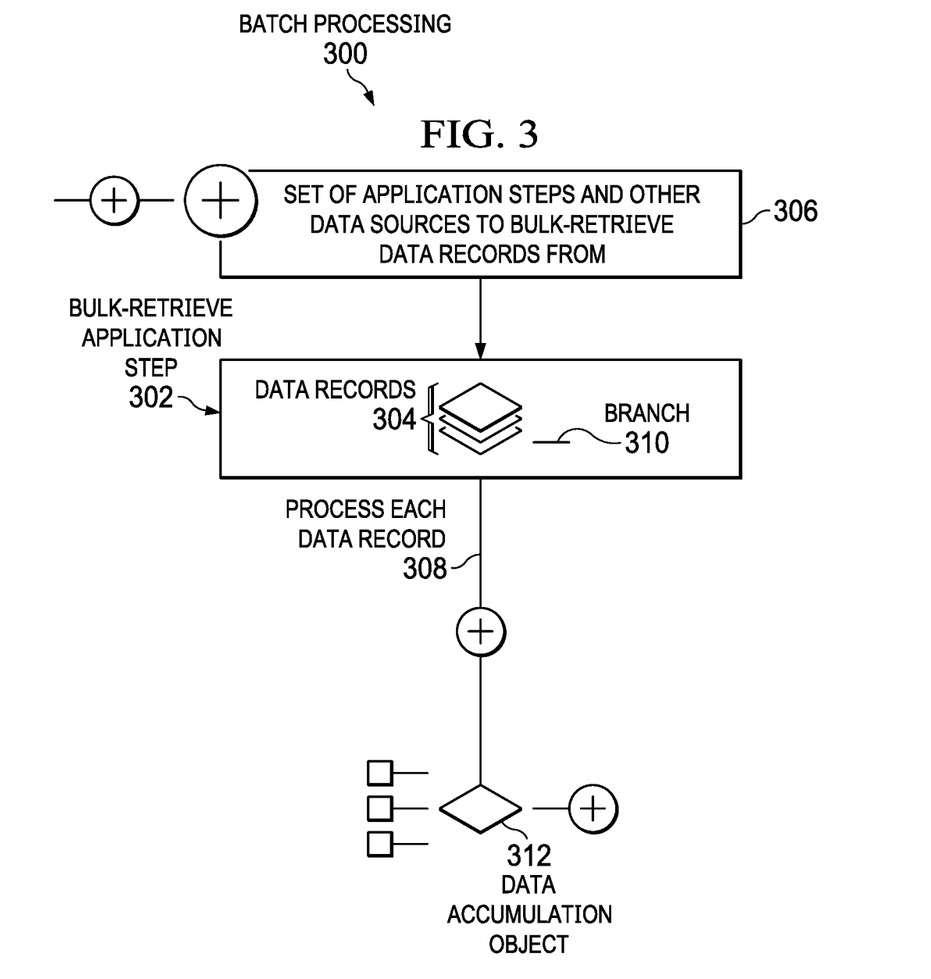
FIG. 3 is a diagram illustrating an example of batch processing in accordance with an illustrative embodiment.

With reference now to FIG. 3, a diagram illustrating an example of batch processing is depicted in accordance with an illustrative embodiment. Batch processing 300 may be implemented in a computer, such as, for example, data processing system 200 in FIG. 2. Batch processing 300 utilizes bulk-retrieve application step 302 to bulk process data records 304, which correspond to a user-specified collection of data records, retrieved from set of application steps 306 and one or more other data record sources. At 308, bulk-retrieve application step 302 processes each data record in data records 304 using branch 310. Branch 310 represents a plurality of different branches of execution that execute in parallel.

At the end of branch 310, batch processing 300 outputs to data accumulation object 312 the accumulation of data from each time branch 310 executes. This accumulation of data (i.e., data accumulation object 312) makes available for each of the plurality of branches of execution in branch 310: 1) result from the last branch of execution to calculate the current accumulation of data; 2) the current data assembly context; and 3) identity of the current data record in the batch that was processed.

Figure 4:
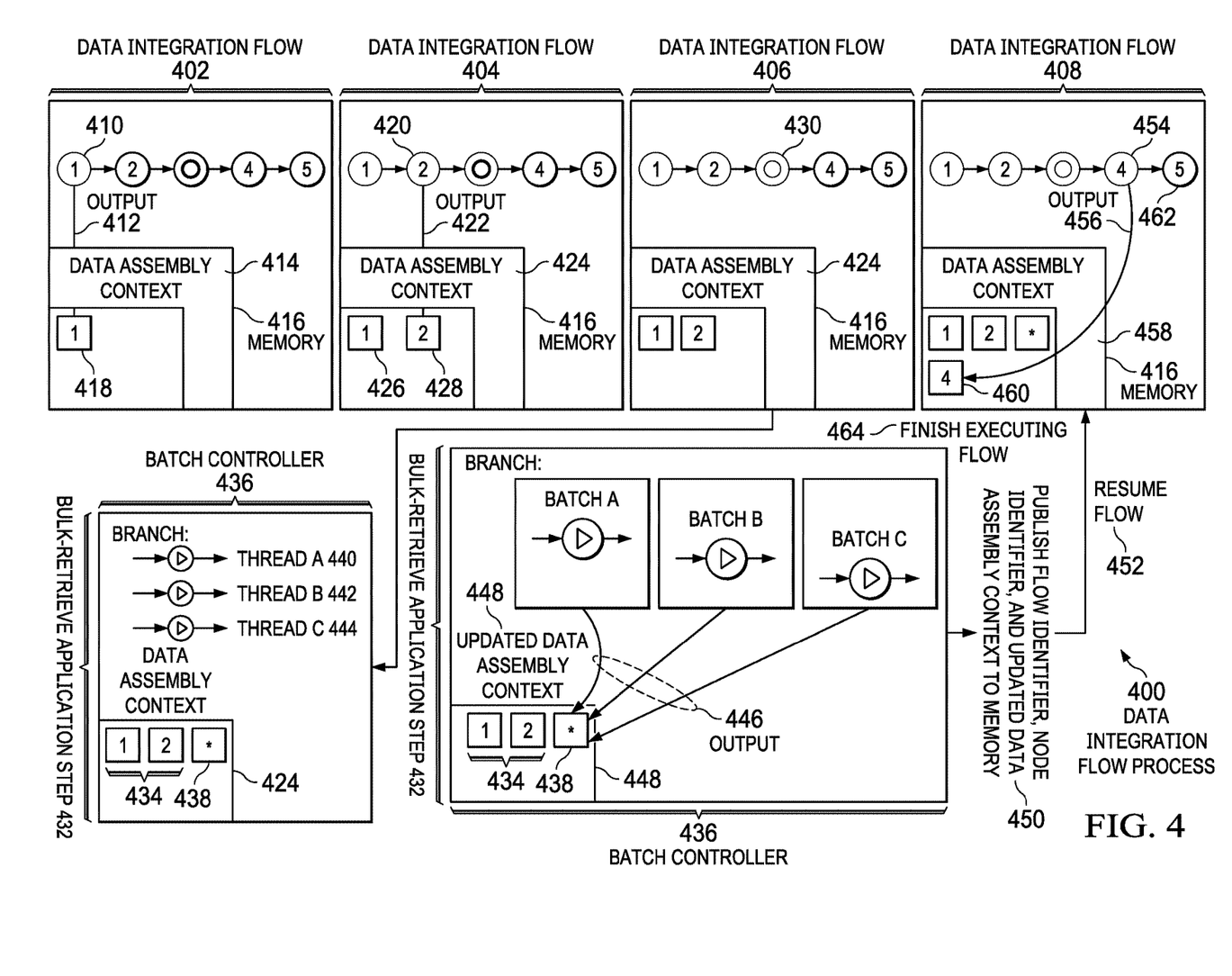
FIG. 4 is a diagram illustrating an example of a data integration flow in accordance with an illustrative embodiment.

With reference now to FIG. 4, a diagram illustrating an example of a data integration flow is depicted in accordance with an illustrative embodiment. Data integration flow process 400 may be implemented in a network of data processing systems, such as, for example, network data processing system 100 in FIG. 1. In this example, data integration flow process 400 includes data integration flow 402, data integration flow 404, data integration flow 406, and data integration flow 408. It should be noted that data integration flow 402, data integration flow 404, data integration flow 406, and data integration flow 408 all represent different stages of the same data integration flow. The data integration flow may be executed by a machine, such as server 104 in FIG. 1.

In this example, data integration flow 402 includes application steps 1-5. However, it should be noted that data integration flow 402 may include more or fewer application steps than illustrated. In other words, a user may define data integration flow 402 to include any number of application steps.

Application step 1 410 represents a first step in data integration flow 402 and performs a function, such as, for example, receive a call to initiate data integration flow 402. Application step 1 410 generates output 412 and stores output 412 in data assembly context 414, which is located in memory 416. In this example, application step 1 410 stores output 412 in data assembly context 414 as data accumulation object 1 418.

Data integration flow process 400 then moves to application step 2 420 in data integration flow 404. Application step 2 420 performs another function, such as, for example, accessing a set of one or more data record sources corresponding to a user-specified collection of data records. Application step 2 420 generates output 422 and stores output 422 in data assembly context 424 located in memory 416. In this example, data assembly context 424 stores data accumulation object 1 426, which is the same as data accumulation object 1 418, and data accumulation object 428, which contains data corresponding to output 422.

Data integration flow process 400 then moves to application step 3 430 in data integration flow 406. Application step 3 430 is bulk-retrieve application step 432, which performs bulk-retrieval and processing of a plurality of data records from the set of data record sources corresponding to the user-specified collection of data records. In addition, data integration flow process 400 copies data assembly context 424 in memory 416 and places the copy of data assembly context 424 in bulk-retrieve application step 432. Data assembly context 424 in bulk-retrieve application step 432 contains set of data accumulation objects 432. Set of data accumulation objects 432 includes data accumulation objects 1 and 2, which correspond to the outputs of application step 1 410 and application step 2 420, respectively.

Further, data integration flow process 400 suspends data integration flow 406 and deletes data assembly context 424 from memory 416. Furthermore, bulk-retrieve application step 432 utilizes batch controller 436 to generate data accumulation object 438, which conforms to a predefined schema. Batch controller 436 stores the results or output of the batch processing of the plurality of data records within data accumulation object 438.

In this example, batch controller 436 executes thread A 440, thread B 442, and thread C 444 to process the plurality of data records in parallel and gives each thread a copy of data assembly context 424. However, it should be noted that batch controller 436 may utilize any number of threads to process the plurality of data records in parallel. Also, it should be noted that thread A 440, thread B 442, and thread C 444 may be located in bulk-retrieve application step 432, in one or more other processes, and/or in one or more other machines. Further, each different thread processes a different data record. Each thread in a different execution branch produces output 446, which batch controller 436 saves in data accumulation object 438 to form updated data assembly context 448. At the end of each processing of each execution branch, batch controller 436 computes a new value for data accumulation object 438 that corresponds to the batch processing based on previously stored values and the current data assembly context of each branch for each data record. Batch controller 436 performs this batch processing in a thread safe manner using one of currently available mechanisms, such as, for example, transactional databases, entity tags, shared memory, and the like.

Batch controller 436 keeps track of each data record already processed. After batch controller 436 processes all of the data records in the user-specified collection of data records, batch controller 436 at 450 publishes the data integration flow identifier, the identifier of the next application step, and updated data assembly context 448 to memory 416 of the machine (e.g., server) that was originally running the data integration flow prior to suspension of the data integration flow. A sever that can run the data integration flow receives the publication and re-instates the integration flow into memory using the integration flow identifier. Afterward, batch controller 436 at 452 initiates resumption of data integration flow 408 at application step 4 454, which follows application step 3 430 in the data integration flow.

Application step 4 454 analyses updated data assembly context 448 to determine the data integration flow identifier and the application step identifier and resumes data integration flow 408. Application step 4 454 performs its user-defined function or task in the flow and generates output 456, which application step 4 454 saves in data assembly context 458 as data accumulation object 460. Data integration flow 408 then passes newly updated data assembly context 458 containing generated data accumulation object 460 to subsequent application step 5 462. Afterward, data integration process 400 finishes at 464.

Figure 5A:
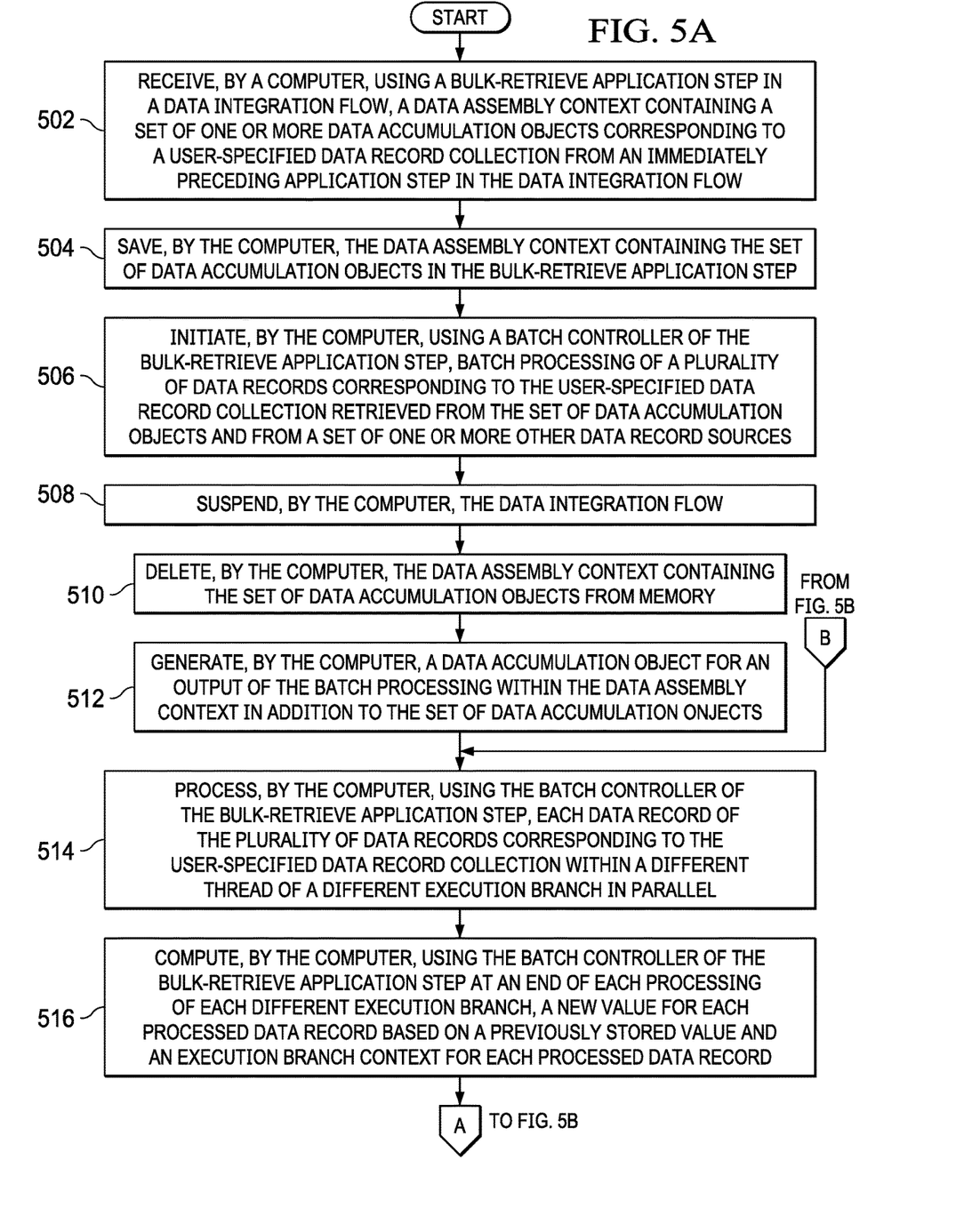
FIGS. 5A-5B are a flowchart illustrating a process for accumulating results from batch processing executed in parallel in accordance with an illustrative embodiment.
Figure 5B:
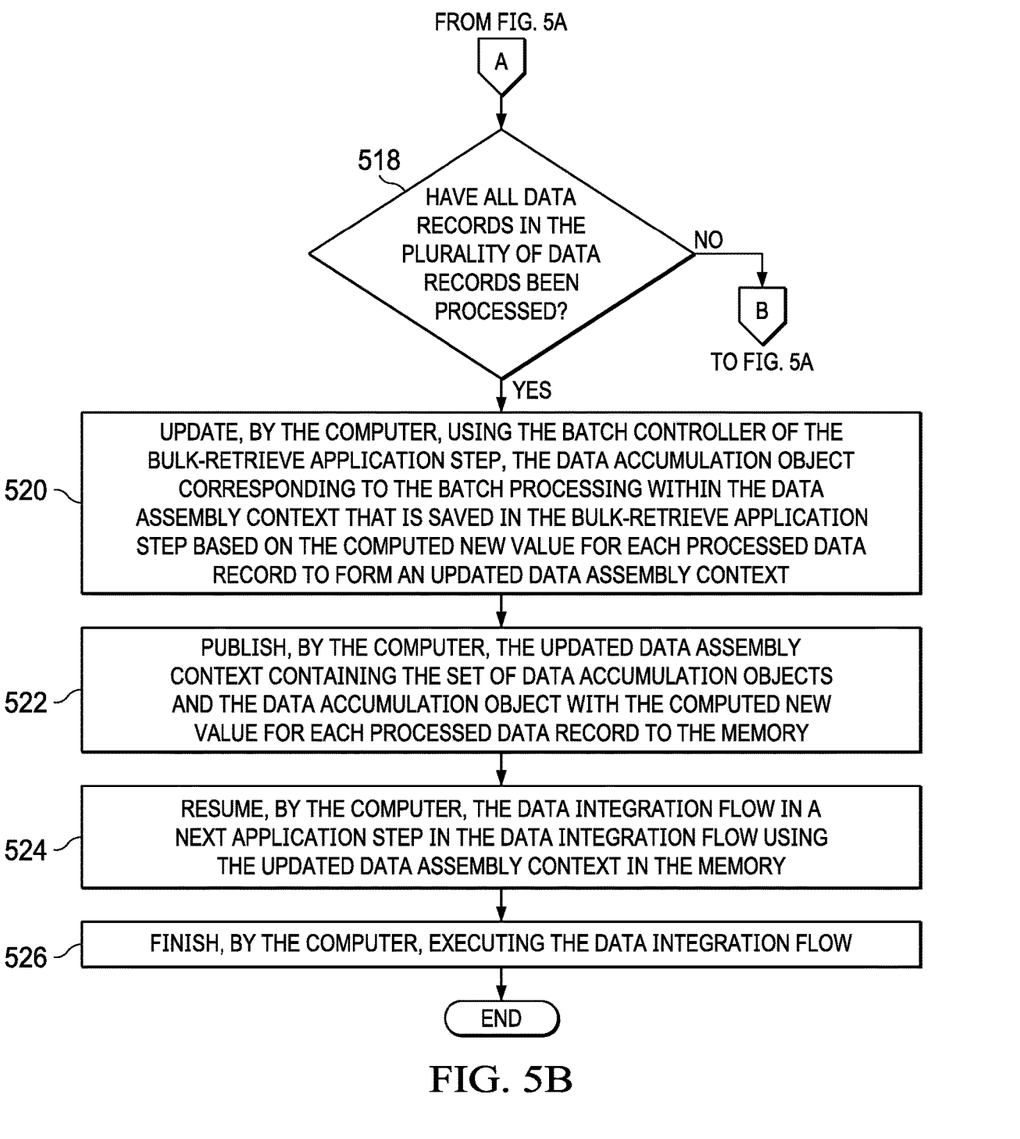

With reference now to FIGS. 5A-5B, a flowchart illustrating a process for accumulating results from batch processing executed in parallel in is shown in accordance with an illustrative embodiment. The process shown in FIGS.

5A-5B may be implemented in a computer, such as, for example, server 106 in FIG. 1 or data processing system 200 in FIG. 2.

The process begins when the computer, using a bulk-retrieve application step in a data integration flow, receives a data assembly context containing a set of one or more data accumulation objects corresponding to a user-specified data record collection from an immediately preceding application step in the data integration flow (step 502). A machine, such as, for example, server 104 in FIG. 1, executes the data integration flow. The computer saves the data assembly context containing the set of data accumulation objects in the bulk-retrieve application step (step 504).

The computer, using a batch controller of the bulk-retrieve application step, initiates batch processing of a plurality of data records corresponding to the user-specified data record collection retrieved from the set of data accumulation objects and from a set of one or more other data record sources (step 506). The set of one or more other data record sources may be, for example, storage 108 containing collection of data records 116 in FIG. 1. In addition, the computer suspends the data integration flow on the machine executing the data integration flow (step 508).

Further, the computer deletes the data assembly context containing the set of data accumulation objects from memory of the computer (step 510). Furthermore, the computer generates a data accumulation object for an output of the batch processing within the data assembly context in addition to the set of data accumulation objects (step 512). The computer, using the batch controller of the bulk-retrieve application step, processes each data record of the plurality of data records corresponding to the user-specified data record collection within a different thread of a different execution branch in parallel (step 514).

At an end of each processing of each different execution branch, the computer, using the batch controller of the bulk-retrieve application step, computes a new value for each processed data record based on a previously stored value and an execution branch context for each processed data record (step 516). The computer makes a determination as to whether all data records in the plurality of data records have been processed (step 518). If the computer determines that not all of the data records in the plurality of data records have been processed, no output of step 518, then the process returns to step 514 where the computer continues to process the data records in parallel in the different threads.

If the computer determines that all of the data records in the plurality of data records have been processed, yes output of step 518, then the computer, using the batch controller of the bulk-retrieve application step, updates the data accumulation object corresponding to the batch processing within the data assembly context, which is saved in the bulk-retrieve application step, based on the computed new value for each processed data record to form an updated data assembly context (step 520). The computer publishes the updated data assembly context containing the set of data accumulation objects and the data accumulation object with the computed new value for each processed data record to the memory of the machine that was executing the data integration flow. (step 522). Moreover, the computer resumes the data integration flow in a next application step in the data integration flow using the updated data assembly context in the memory of the machine (step 524). Subsequently, the computer finishes executing the data integration flow (step 526). Thereafter, the process terminates.

Thus, illustrative embodiments of the present invention provide a computer-implemented method, computer system, and computer program product for accumulating results from batch processing executed in parallel and resuming execution of a main data integration flow with the accumulated results passed in. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for passing a result of batch processing into a data integration flow, the computer-implemented method comprising:

receiving, by a computer, from an application step immediately preceding a bulk-retrieve application step in a data integration flow that includes a plurality of application steps for integrating a specified data record collection, a data assembly context containing parameters of assembling the specified data record collection, a set of data accumulation objects where each data accumulation object in the set stores a result of a corresponding application step in the data integration flow, an identifier of the data integration flow, and an identifier of a next application step in the data integration flow;

placing, by the computer, the data assembly context within the bulk-retrieve application step located in persistent storage separate from memory of the computer prior to deleting the data assembly context from the memory;

deleting, by the computer, the data assembly context completely from the memory of the computer upon initiating batch processing of the specified data record collection by the bulk-retrieve application step; and performing, by the computer, the batch processing of each data record of a plurality of data records corresponding to the specified data record collection using the data assembly context within the bulk-retrieve application step in the persistent storage without the data assembly context being in the memory while the bulk-retrieve application step performs the batch processing as a runtime of the bulk-retrieve application step cannot process the specified data record collection in the memory due to size of the specified data record collection not fitting into the memory.

2. The computer-implemented method of claim 1 further comprising:

initiating, by the computer, using the bulk-retrieve application step, the batch processing of the plurality of data records corresponding to the specified data record collection retrieved from the set of data accumulation objects and from a set of other data record sources; and suspending, by the computer, the data integration flow on the computer upon initiating the batch processing of the specified data record collection by the bulk-retrieve application step.

3. The computer-implemented method of claim 1 further comprising:

generating, by the computer, a batch processing data accumulation object corresponding to the batch processing within the data assembly context in addition to the set of data accumulation objects.

4. The computer-implemented method of claim 1, wherein an application step in the plurality of application steps is a logical action step that runs program code to perform a particular function in the data integration flow.

5. The computer-implemented method of claim 1, wherein a batch processing data accumulation object corresponding to the batch processing is saved in the data assembly context of the bulk-retrieve application step.

6. The computer-implemented method of claim 1, wherein the batch processing is executed in parallel by a plurality of threads located in the computer.

7. The computer-implemented method of claim 1, wherein the batch processing is executed in parallel by a plurality of threads located in the computer and one or more other computers.

8. A computer system for passing a result of batch processing into a data integration flow, the computer system comprising:
 a bus system;
 a storage device connected to the bus system, wherein the storage device stores program instructions; and
 a processor connected to the bus system, wherein the processor executes the program instructions to:
  receive, from an application step immediately preceding a bulk-retrieve application step in a data integration flow that includes a plurality of application steps for integrating a specified data record collection, a data assembly context containing parameters of assembling the specified data record collection, a set of data accumulation objects where each data accumulation object in the set stores a result of a corresponding application step in the data integration flow, an identifier of the data integration flow, and an identifier of a next application step in the data integration flow;
  place the data assembly context within the bulk-retrieve application step located in persistent storage separate from memory of the computer system prior to deleting the data assembly context from the memory;
  delete the data assembly context completely from the memory of the computer system upon initiating batch processing of the specified data record collection by the bulk-retrieve application step; and
  perform the batch processing of each data record of a plurality of data records corresponding to the specified data record collection using the data assembly context within the bulk-retrieve application step in the persistent storage without the data assembly context being in the memory while the bulk-retrieve application step performs the batch processing as a runtime of the bulk-retrieve application step cannot process the specified data record collection in the memory due to size of the specified data record collection not fitting into the memory.

9. The computer system of claim 8, wherein the processor further executes the program instructions to:
 initiate, using the bulk-retrieve application step, the batch processing of the plurality of data records corresponding to the specified data record collection retrieved from the set of data accumulation objects and from a set of other data record sources; and
 suspend the data integration flow on the computer upon initiating the batch processing of the specified data record collection by the bulk-retrieve application step.

10. A computer program product for passing a result of batch processing into a data integration flow, the computer program product comprising a computer readable storage medium having program instructions embodied therewith, the program instructions executable by a computer to cause the computer to perform a method comprising:
 receiving, by the computer, from an application step immediately preceding a bulk-retrieve application step in a data integration flow that includes a plurality of application steps for integrating a specified data record collection, a data assembly context containing parameters of assembling the specified data record collection, a set of data accumulation objects where each data accumulation object in the set stores a result of a corresponding application step in the data integration flow, an identifier of the data integration flow, and an identifier of a next application step in the data integration flow;
 placing, by the computer, the data assembly context within the bulk-retrieve application step located in persistent storage separate from memory of the computer prior to deleting the data assembly context from the memory;
 deleting, by the computer, the data assembly context completely from the memory of the computer upon initiating batch processing of the specified data record collection by the bulk-retrieve application step; and
 performing, by the computer, the batch processing of each data record of a plurality of data records corresponding to the specified data record collection using the data assembly context within the bulk-retrieve application step in the persistent storage without the data assembly context being in the memory while the bulk-retrieve application step performs the batch processing as a runtime of the bulk-retrieve application step cannot process the specified data record collection in the memory due to size of the specified data record collection not fitting into the memory.

11. The computer program product of claim 10 further comprising:
 initiating, by the computer, using the bulk-retrieve application step, the batch processing of the plurality of data records corresponding to the specified data record collection retrieved from the set of data accumulation objects and from a set of other data record sources; and
 suspending, by the computer, the data integration flow on the computer upon initiating the batch processing of the specified data record collection by the bulk-retrieve application step.

12. The computer program product of claim 10 further comprising:
 generating, by the computer, a batch processing data accumulation object corresponding to the batch processing within the data assembly context in addition to the set of data accumulation objects.

13. The computer program product of claim 10, wherein an application step in the plurality of application steps is a logical action step that runs program code to perform a particular function in the data integration flow.

14. The computer program product of claim 10, wherein a batch processing data accumulation object corresponding to the batch processing is saved in the data assembly context of the bulk-retrieve application step.

15. The computer-implemented method of claim 1 further comprising:
 responsive to the computer determining that all of the data records in the plurality of data records have been processed, generating, by the computer, a batch processing data accumulation object corresponding to the batch processing within the data assembly context based on a computed new value for each processed data record to form an updated data assembly context;

moving, by the computer, the updated data assembly context containing the batch processing data accumulation object corresponding to the batch processing that includes the computed new value for each processed data record to the memory; and resuming, by the computer, the data integration flow in the next application step after the bulk-retrieve application step in the data integration flow using the updated data assembly context moved to the memory.

16. The computer system of claim 8, wherein the processor further executes the program instructions to:

generate a batch processing data accumulation object corresponding to the batch processing within the data assembly context based on a computed new value for each processed data record to form an updated data assembly context in response to determining that all of the data records in the plurality of data records have been processed;

move the updated data assembly context containing the batch processing data accumulation object corresponding to the batch processing that includes the computed new value for each processed data record to the memory; and resume the data integration flow in the next application step after the bulk-retrieve application step in the data integration flow using the updated data assembly context moved to the memory.

17. The computer program product of claim 10 further comprising:

responsive to the computer determining that all of the data records in the plurality of data records have been processed, generating, by the computer, a batch processing data accumulation object corresponding to the batch processing within the data assembly context based on a computed new value for each processed data record to form an updated data assembly context;

moving, by the computer, the updated data assembly context containing the batch processing data accumulation object corresponding to the batch processing that includes the computed new value for each processed data record to the memory; and resuming, by the computer, the data integration flow in the next application step after the bulk-retrieve application step in the data integration flow using the updated data assembly context moved to the memory.

* * * * *